Oct. 7, 1958

H. F. BLISS 2,855,118

SPARE TIRE HOLDER AND HOIST

Filed April 27, 1956

INVENTOR
HARRY F. BLISS

BY

*Young & Wright*

ATTORNEYS

Oct. 7, 1958 — H. F. BLISS — 2,855,118
SPARE TIRE HOLDER AND HOIST
Filed April 27, 1956 — 2 Sheets-Sheet 2
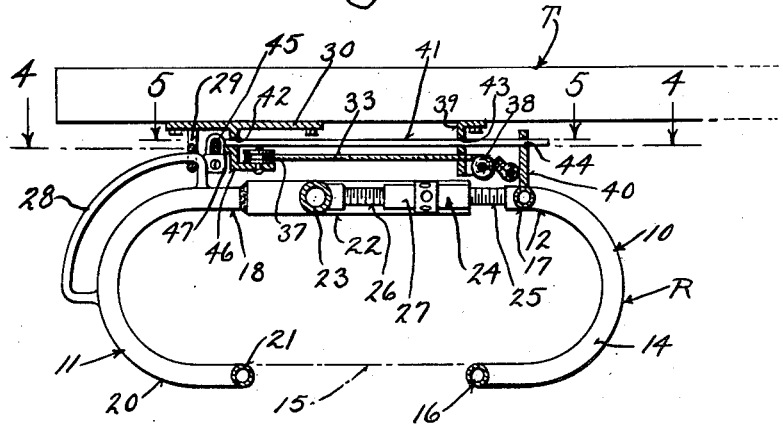
Fig. 3.
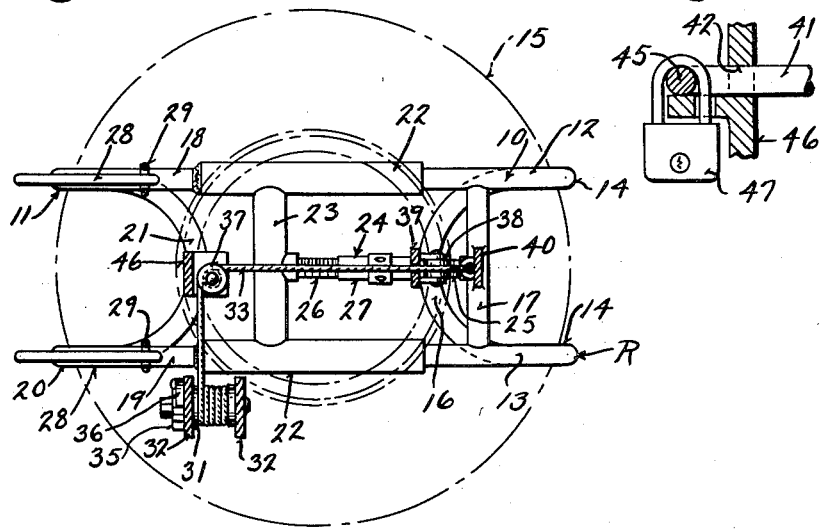
Fig. 4.   Fig. 6.
Fig. 5.
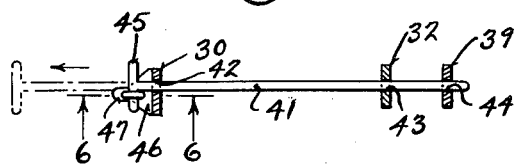
INVENTOR
HARRY F. BLISS
ATTORNEYS United States Patent Office 2,855,118
Patented Oct. 7, 1958

2,855,118
SPARE TIRE HOLDER AND HOIST

Harry F. Bliss, Orfordville, Wis., assignor of one-half to Harold C. Remfrey, Beloit, Wis.

Application April 27, 1956, Serial No. 581,151

2 Claims. (Cl. 214—454)

This invention appertains to vehicle attached spare tire carriers and more particularly to novel means for handling and carrying the heavy spare tire of a truck or similar large vehicle.

It is customary to provide a rack under the body of the truck for carrying a spare tire or a spare tire and its attaching rim, as the case may be. Due to the weight of the truck tire and the rim and the location of the rack, much difficulty is encountered in placing and removing a tire on and off the rack and this operation often requires the services of two men.

One of the primary objects of my invention is to provide a tire rack for trucks and the like, which is so constructed that the same can be conveniently lowered to a vertical position so that the tire can be rolled on and off the rack without the lifting of the tire, and whereby the rack can be raised to a horizontal position with the tire thereon under the truck body and firmly held in such position for carrying the spare tire when the truck is in service.

Another salient object of my invention is to provide a spare tire rack embodying a pair of companion sections slidable toward and away from one another with means for bringing the sections together for firmly gripping the tire for transportation and for moving the sections away from one another to release the tire.

A further object of my invention is to provide a simple and efficient means for raising and lowering the rack after adjustment of the sections thereof to a tire gripping position.

A further important object of my invention is to provide novel means for mounting the rack on the truck so that when the rack is swung down to its vertical position and the rack sections are adjusted away from one another to a tire releasing position, the outermost section will be forced into intimate binding contact with the ground whereby to prevent accidental movement of the rack during the rolling of a tire on and off the rack.

With these and other objects in view, the invention consists in the novel construction, arrangement and formation of parts, as will be hereinafter more specifically described and claimed and illustrated in the accompanying drawings, in which drawings, Figure 1 is a fragmentary side elevational view of a truck or the like showing my novel tire carrier and hoist associated therewith, the carrier being in its lowered vertical position to permit the rolling of the spare tire on and off the same;

Figure 3 is a view similar to to Figure 2, but showing the carrier or rack in its raised horizontal position for transporting a tire, the view also being shown partly broken away and in section;

Figure 4 is a horizontal sectional view taken on the line 4—4 of Figure 3, looking in the direction of the arrows;

Figure 5 is a detail horizontal sectional view taken on the line 5—5 of Figure 3, looking in the direction of the arrows and illustrating the novel means employed for holding the rack in its horizontal tire carrying position against accidental movement incident to truck travel over a roadway;

Figure 6 is an enlarged fragmentary detail vertical sectional view taken on the line 6—6 of Figure 5, looking in the direction of the arrows, illustrating a means for locking the rack or tire carrier or holding means against unauthorized removal.

Referring to the drawings in detail, wherein similar reference characters designate corresponding parts throughout the several views, the letter R generally indicates my novel tire carrier or rack and T a truck or similar heavy vehicle with which the carrier or rack can be associated.

Figure 1:
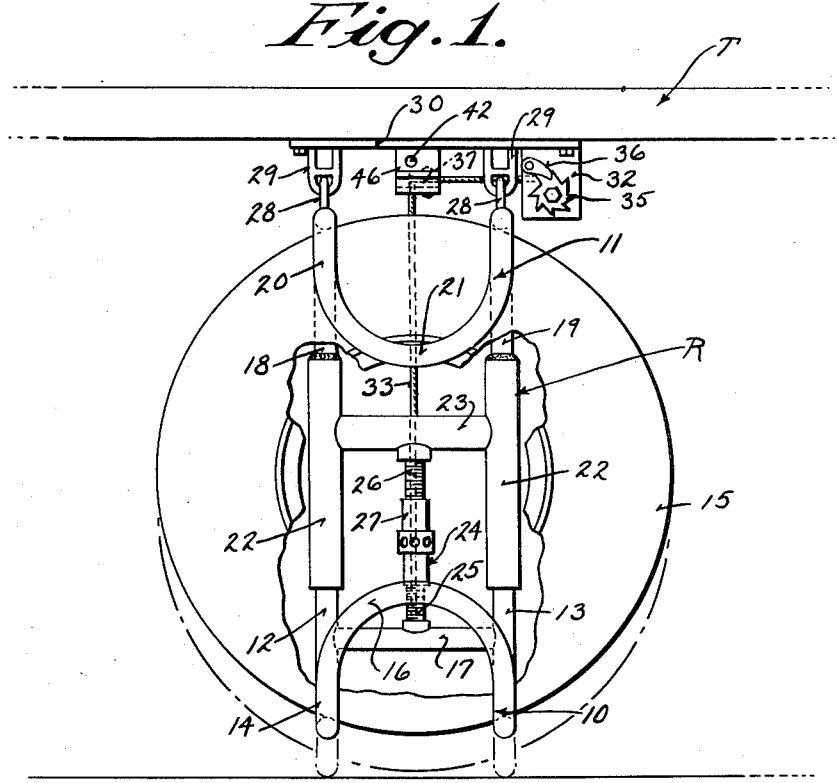

Only a fragment of the truck T has been shown in the drawings and this can be considered as either a truck body or the frame of the truck.

The rack or tire carrier R includes a pair of inner and outer companion sections 10 and 11 and these sections are slidably associated so that the same can be moved toward and away from one another, as will be now described. These sections 10 and 11 can be made in various manners and as illustrated the sections are preferably formed from lengths of tube bent into the desired configuration. Hence, the innermost section 10 consists of a pair of spaced parallel legs 12 and 13 bent outwardly and upwardly on a curve, as at 14, corresponding to the transverse configuration of a tire indicated by the reference character 15. The terminals of the curved portions 14 of the legs 12 and 13 are joined by an arcuate bight portion 16. The legs themselves are braced by a transverse brace bar 17.

The outer section 11 is formed similar to the inner section 10 and this outer section also includes spaced parallel legs 18 and 19. The outer or upper ends of the legs are curved outwardly and downwardly, as at 20, to conform to the transverse curvature of a tire, and the extreme outer terminals of the curved portions are joined by an arched bight portion 21. Welded, or otherwise secured, to the legs 18 and 19 are sleeves 22 and these sleeves telescopically receive the legs 12 and 13 of the inner section. The sleeves 22 and consequently the legs 18 and 19 are braced by a transverse bar 23 or the like.

With the sections 10 and 11 slid apart the same can receive a tire 15 therebetween and when a tire is placed between the sections, with the curved portions 14 and 20 of the sections extending over the opposite sides of a tire, the sections can be slid toward one another to firmly grip the tire.

Means is provided for bringing about the adjustment of the sections 10 and 11 toward one another, or away from one another to a tire gripping or released position. This means can be in the nature of a jack 24 and this jack 24 can be of any well known construction, either of the hydraulic or mechanical type. As illustrated, the jack 24 includes oppositely threaded screws 25 and 26 rigidly secured respectively to the brace bars 17 and 23. The screws are coupled by a turn buckle nut 27 and this nut can be rotated in any desired way.

The curved portions 20 of the legs 18 and 19 of the outermost section 11 have welded or otherwise secured thereto arcuate loops or tracks 28 which extend rearwardly over the legs and these tracks are pivotally and slidably supported in spaced depending eyes 29. The eyes 29 are welded or otherwise fastened to a supporting bracket 30 which is in turn rigidly secured to the under side of the truck T, and hence the rack is supported from the under side of the truck for swinging and sliding movement to a raised horizontal operative position or to a lowered, vertical inoperative position.

Figure 2:
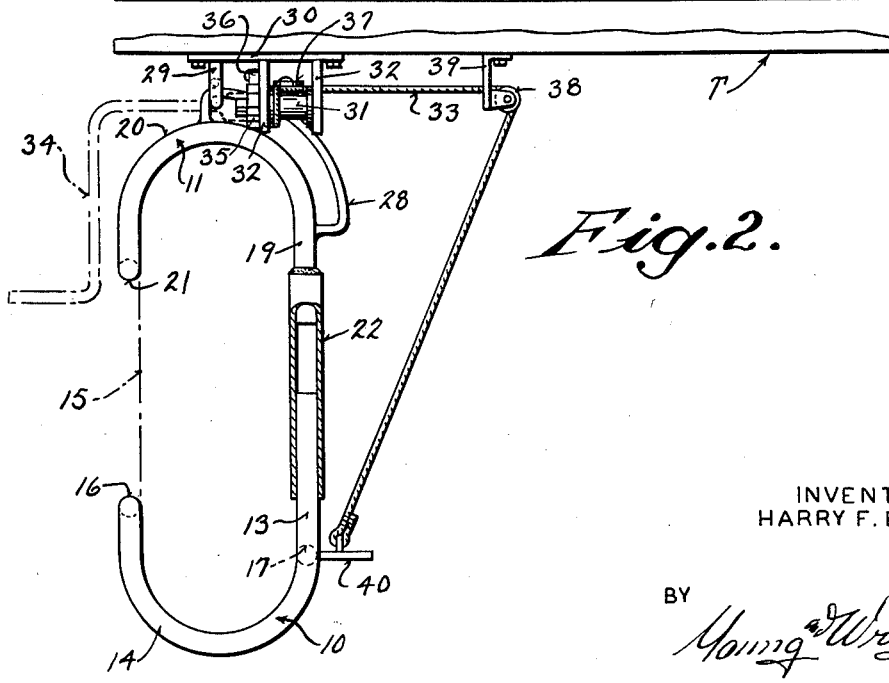
Figure 2 is an end elevational view of the carrier with parts thereof broken away and in section to illustrate structural detail, showing the same attached to a truck and with the carrier in its lowered vertical position.

Means is provided for raising and lowering the rack R on the truck and this means can include a drum or windlass 31 rotatably carried by depending bearing plates 32, welded or otherwise secured to the bracket 30. The drum 31 has wound thereon a cable 33 and the drum can be turned for winding up or paying off the cable therefrom. The drum can be rotated in any suitable manner, such as by a hand crank 34, shown in dotted lines in Figure 2. A ratchet wheel 35 and a dog 36 are provided for holding the drum against accidental rotation in one direction and particularly against the paying off of the cable 33 from the drum when the cable is wound thereon. The drum 31 is preferably located at one side of the rack R, as is best shown in Figures 1 and 4. The cable is trained around longitudinally aligned idle pulleys 37 and 38 located above the rack but at the longitudinal center thereof. The guide and idle pulley 37 is rotatably carried by the bracket 30 and the guide and idle pulley 38 is rotatably carried by a bracket 39 which is rigidly secured to the truck in rear of the bracket 30. The end of the cable 33 remote from the drum is fastened to an attaching plate 40, which is welded or otherwise fastened to the crossbar 17 of the innermost section 10 of the rack.

Considering that the rack is in its vertical inoperative position, then by turning the drum 31 and winding the cable 33 thereon the cable will pull up on the lower end of the rack and raise the same to a horizontal position and during this raising, swinging movement of the rack, the same will slide forwardly on the eyes 32 due to the connection of the arcuate tracks 28 therewith.

In use of the carrier and hoist and now considering that the same is in its operative raised horizontal position for carrying a tire and it is desired to remove the spare tire therefrom, then the drum is released and allowed to rotate in a retrograde direction so that the cable 33 will be payed off the drum and the rack will swing down to a horizontal position. The jack 24 is now operated so as to forcibly move the sections 10 and 11 away from one another and this will release the sections from their gripping position with the tire. With continued operation of the jack, the section 10 can be brought down into firm intimate contact with the ground so that accidental swinging movement of the rack is prevented. At this time, the tire can be easily rolled off the rack. The tire being replaced can be readily rolled into the rack and when this tire is in the rack the jack is operated so as to bring the sections 10 and 11 toward one another in gripping contact with the tire, after which the rack can be raised by the drum or windlass to its horizontal tire carrying position.

During the travel of a truck over a roadway, I prefer to provide an effective, positive means for locking the rack in its raised horizontal position against accidental movement and to accomplish this I employ a locking rod 41 and this rod is slid through guide openings 42, 43 and 44 formed respectively in the bracket 30, the bracket 39 and the attaching plate 40. Obviously, when the rack is swung to its correct raised position, the opening 44 in the attaching plate 40 will be in longitudinal alignment with the openings 42 and 43.

With the rod in its supporting position, the rack is firmly held against accidental displacement.

If desired, means can be provided for preventing the unauthorized removal of the rod 41 from the brackets so that the stealing of the tire will be prevented. The outer end of the rod 41 can be provided with a manipulating handle 45 and when the rod is in its operative position, this handle overlies an apertured ear 46 carried by the bracket 30. The hasp of a padlock 47 can be passed through the aperture and ear 46 and over the handle 45.

From the foregoing description, it can be seen that I have provided an efficient and simple means for facilitating the handling and carrying of heavy spare tires for trucks.

While the tire carrier and hoist has been particularly designed for the carrying of heavy truck tires, it is to be understood that the device can also be utilized for carrying spare automobile tires. In this instance the hoist could be eliminated. The carrier would then be attached to a convenient and desired place on the automobile and still include the slidably connected sections with the jack for firmly gripping tires of different sizes.

Changes in details may be made without departing from the spirit or the scope of this invention, but what I claim as new is:

1. A spare tire carrier and lift for trucks of the type adapted to be positioned under the truck body comprising a rack for receiving and carrying the tire including a pair of like companion sections slidably connected together, means for positively adjusting the sections toward one another to grip a tire and away from one another to release a tire, means slidably and pivotally connecting one end of the rack with the truck body including guide tracks secured to one of said rack sections, supporting eyes slidable in said tracks connected with said truck body, and means connected with the opposite end of the rack for raising and lowering the rack.

2. A spare tire carrier and lift for trucks of the type adapted to be positioned under the truck body comprising a rack for receiving and carrying the tire including a pair of companion sections each including spaced parallel legs and an arcuately curved portion on one end of the legs for extending over a tire, the legs of one section slidably receiving the legs of the other section, means for adjusting the sections toward and away from one another, means pivotally and slidably connecting the carrier at one end to the truck including curved guide tracks extending over the arcuate portion of one section, and supporting eyes slidable in the guides, and means for raising and lowering the rack on its pivotal and slidable connection.

References Cited in the file of this patent

UNITED STATES PATENTS

| | | |
|---|---|---|
| 1,723,320 | Zibelman | Aug. 6, 1929 |
| 1,813,094 | Appel | July 7, 1931 |
| 2,232,744 | Thames | Feb. 25, 1941 |
| 2,354,943 | Clark | Aug. 1, 1944 |
| 2,404,534 | Sargent et al. | July 23, 1946 |